United States Patent [19]

Naruke et al.

[11] Patent Number: 5,136,748
[45] Date of Patent: Aug. 11, 1992

[54] MOUNTING STRUCTURE FOR WIPER FOR VEHICLE

[75] Inventors: Masao Naruke, Atsugi; Kenichi Inoue, Zama, both of Japan

[73] Assignee: Nissan Motor Co., Ltd., Yokohama, Japan

[21] Appl. No.: 688,133

[22] Filed: Apr. 19, 1991

[30] Foreign Application Priority Data

Apr. 23, 1990 [JP] Japan ................ 2-43382[U]

[51] Int. Cl.⁵ .......................................... B60S 1/40
[52] U.S. Cl. ............................. 15/250.32; 15/250.31
[58] Field of Search ........... 15/250.32, 250.31, 250.35, 15/250.42, 250.36

[56] References Cited

U.S. PATENT DOCUMENTS

| 2,353,208 | 7/1944 | Whitted ........................... 15/250.35 |
| 4,416,032 | 11/1983 | Mohnach et al. .................. 15/250.32 |

FOREIGN PATENT DOCUMENTS

| 1047040 | 12/1958 | Fed. Rep. of Germany ... 15/250.32 |
| 2057213 | 9/1971 | Fed. Rep. of Germany ... 15/250.32 |
| 2742022 | 3/1979 | Fed. Rep. of Germany ... 15/250.32 |
| 2930680 | 2/1981 | Fed. Rep. of Germany ... 15/250.32 |
| 1238655 | 7/1960 | France ............................... 15/250.32 |

OTHER PUBLICATIONS

Watanabe Japanese Utility Model Laid Open Publication No. 62-202462 Dec. 24, 1987.

Primary Examiner—Harvey C. Hornsby
Assistant Examiner—Gary K. Graham
Attorney, Agent, or Firm—Foley & Lardner

[57] ABSTRACT

A mounting structure for a vehicle wiper having a wiper arm and a wiper blade connected to a tip of the wiper arm. The wiper arm has a curved portion formed by curving the tip of the wiper arm and a slot opened at a tip of the curved portion. The wiper blade has a clip formed as a body engaged by the curved portion, a pair of wall portions formed, one at each side of the body, a click engaged in the slot, and a lever. The lever is formed so as to be forced into the slot to force the side edges of the curved portion against the inner sides of the wall portions and to disengage the click from the slot through deformation of the clip by pressing the lever.

1 Claim, 3 Drawing Sheets

MOUNTING STRUCTURE FOR WIPER FOR VEHICLE

BACKGROUND OF THE INVENTION

1. Field of the Invention

The present invention relates to a mounting structure for a windshield wiper for a vehicle, such as an automobile.

2. Description of the Prior Art

A vehicle, such as an automobile, is generally provided with a wiper for removing rain drops, dust or the like on the windshield. The wiper comprises a wiper arm connected to a wiper shaft rotatably mounted on the vehicle body and a wiper blade which is connected to the wiper arm.

The wiper blade is connected to the wiper arm in such a manner as illustrated in FIGS. 1 to 4 for example. The wiper arm 1 has a curved portion 2 which is formed by curving the tip of the wiper arm 1. The curved portion 2 is connected to a central portion of the wiper blade 3. The wiper blade 3 has a pair of frames 4, 4 at the central portion. A clip 5 made of resin is positioned between the frames 4 and is mounted on the frames 4 through a rivet 6 (refer to Japanese Laid Open Utility Model Publication No. 62-202462).

The curved portion 2 of the wiper arm 1 is elastically connected with the clip 5 in such a manner that the curved portion 2 of the wiper arm 1 engages a portion of the clip 5. The clip 5, 1 as shown in FIG. 3, comprises a pair of wall portions 7, 7 in contact with the frames 4, 4 of wiper blade 3, a clip body 8 which is U-shaped in longitudinal section and is positioned between the wall portions 7, 7, an elastic plate 9 positioned on the lower side in FIG. 3 and integrally joined to the clip body 8, and a click 10 formed on the lower side of the clip body 8. The click 10 is formed to fit into a opening 11 provided in the curved portion 2.

Consequently, when the curved portion 2 of the wiper arm 1 engages the clip body 8 as illustrated in FIG. 3, the click 10 of the clip 5 is elastically engaged in the opening 11 of the curved portion 2 through the elastic plate 9. When the elastic plate 9 is pressed in the upper direction as indicated by an arrow in FIG. 2, the click 10 disengages the opening 11 of the curved portion 2 and the wiper arm 1 come off the clip 5.

However, in the above conventional mounting structure for a wiper for a vehicle, the width D1 of the curved portion 2 of the wiper arm 1 is smaller than the width D2 between the two wall portions 7, 7. Therefore, a gap P occurs between the curved portion 2 of the wiper arm 1 and the wall portion 7, 7 of the clip 5, and the gap P causes the wiper arm 1 to wobble as illustrated by the angle Q in FIG. 1.

When the wiper blade 3 is detached from the wiper arm 1, it is necessary to press the elastic plate 9 of the clip 5 in the direction indicated by the arrow. In that case, the operation is not smooth because it is difficult to identify the portion of the elastic plate 9 or the like.

SUMMARY OF THE INVENTION

It is an object of the present invention to provide a mounting structure for a wiper for a vehicle which does not produce a noise because of wobbling of the wiper arm.

Another object of the invention is to provide a mounting structure for a wiper for a vehicle which provides easy removal of the wiper blade.

These and other objects can be achieved according to the present invention by providing a mounting structure for a wiper for a vehicle comprising: a wiper arm having a curved portion formed by curving the tip of the wiper arm and a slot opened at the tip of the curved portion; a wiper blade with a clip member comprising a body portion engaged by the curved portion, a pair of wall portions formed, one at each side of the body portion, a click portion engaging the slot, and a lever portion formed so as to be forced into the slot to force the side edges of the curved portion against the inner sides of the wall portions and to disengage the click from the slit through deformation of the clip member by pressing the lever portion.

In this mounting structure for a vehicle wiper blade, when the curved portion engages the body portion of the clip member, the click engages the slot of the wiper arm. In this case, the lever portion is forced into the slot and the width of the curved portion is increased. Therefore, the outer sides of the curved portion closely contact with the inner sides of the wall portions of the clip member so that the wiper blade is securely mounted on the wiper arm.

Moreover, to remove the wiper blade, the lever portion is pressed, the click is disengaged from the slot through deformation of the clip member so that the wiper blade can be dismounted from the wiper arm.

DETAILED DESCRIPTION OF THE PREFERRED EMBODIMENTS

Figure 1:
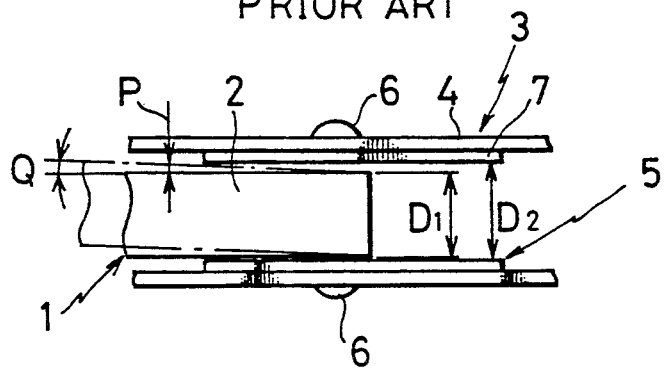
FIG. 1 shows a plan view of a conventional mounting structure for a wiper for a vehicle.
Figure 2:
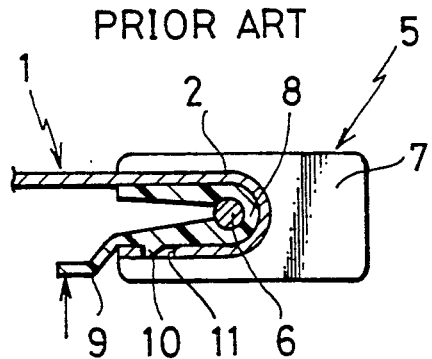
FIG. 2 is a sectional view of the conventional mounting structure for the wiper shown in FIG. 1.
Figure 3:
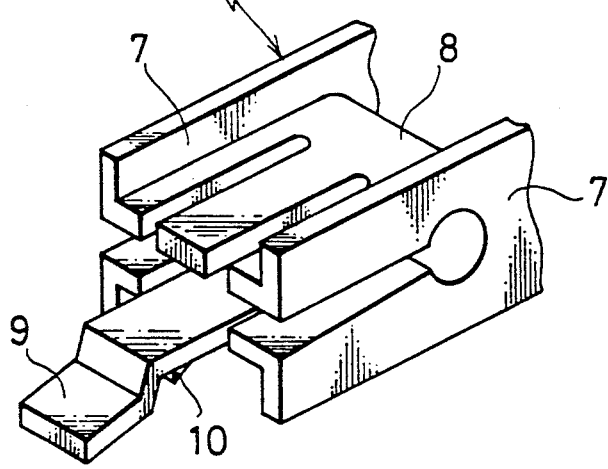
FIG. 3 is a perspective view of the clip shown in FIG. 2.
Figure 4:
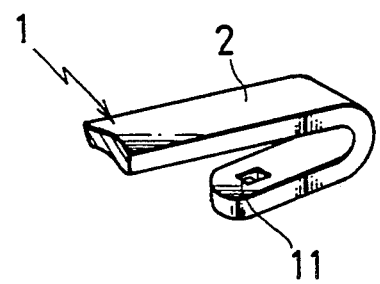
FIG. 4 is a perspective view of the curved portion of the wiper arm shown in FIG. 2.
Figure 5:
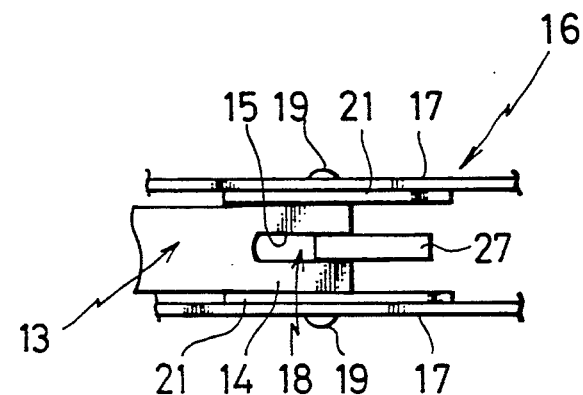
FIG. 5 shows a plan view of an embodiment of the present invention.
Figure 6:
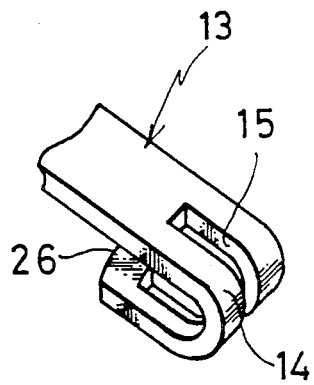
FIG. 6 is a perspective view of the curved portion of the wiper arm shown in FIG. 5.
Figure 7:
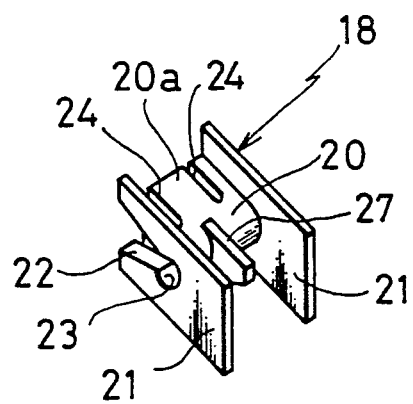
FIG. 7 is a perspective view of the clip shown in FIG. 5.

Referring to FIGS. 5 and 6, a wiper arm 13 is provided with a curved portion 14 which is integrally formed by curving the tip of the wiper arm 13. The curved portion 14 has a slot 15 which is open at the tip of the curved portion 14.

A wiper blade 16 is provided with a pair of frames 17, 17 at the central portion. The frames 17, 17 are positioned in opposition to one another. A clip 18 is positioned between the frames 17, 17 and the clip 18 is mounted on the frames 17, 17 through a rivet 19. The curved portion 14 of the wiper arm 13 is elastically connected to the clip 18 in such a manner that the curved portion 14 of the wiper arm 13 engages a body portion of the clip 18. The clip 18 is preferably made of elastic material such as resin.

The clip 18, as shown in FIGS. 5, 7, 8, 9 and 10, integrally comprises a clip body 20 with which the curved portion 14 of the wiper arm 13 engages, and a pair of wall portions 21, 21 which are formed, one at each side of the clip body 20 and are in contact with the frames 17, 17 of the wiper blade 16. The clip body 20 is formed in a U-shape in longitudinal section and integrally comprises an upper wall 20a and a lower wall 20b. The wall portions 21, 21 respectively have slots 22, 22 adjusted to the U-shape of the clip body 20 and respectively have holes 23, 23 leading to the slots 22, 22. The holes 23, 23 lead one another and are formed to allow the rivet 19 to be inserted in the holes 23, 23. The upper wall 20a and the lower wall 20b respectively have slots 23, 23 on both sides to provide the walls 20a, 20b with elasticity.

Figure 8:
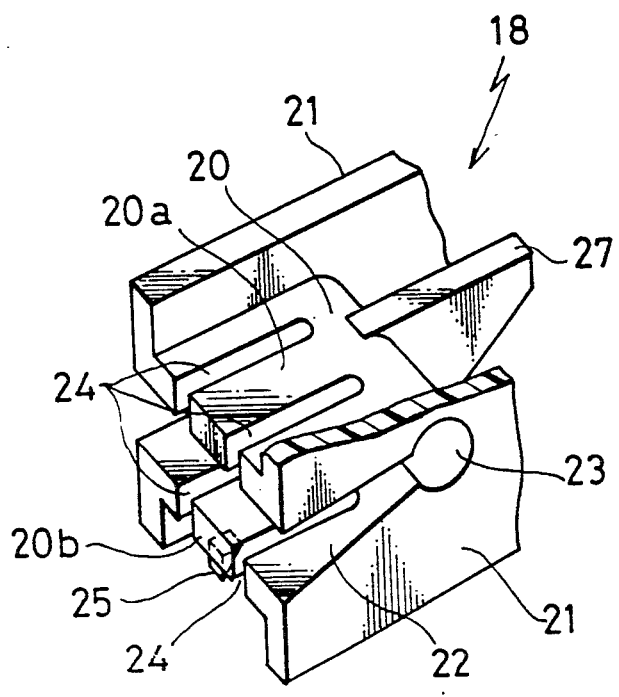
FIG. 8 is another enlarged perspective view of the clip shown in FIG. 7.
Figure 9:
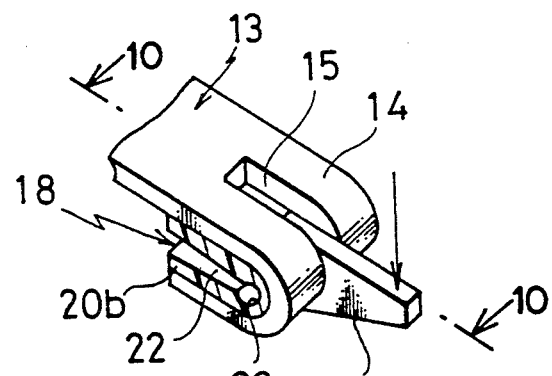
FIG. 9 is a perspective view showing the coupling condition between the clip and the curved portion of the wiper blade shown in FIG. 5.
Figure 10:
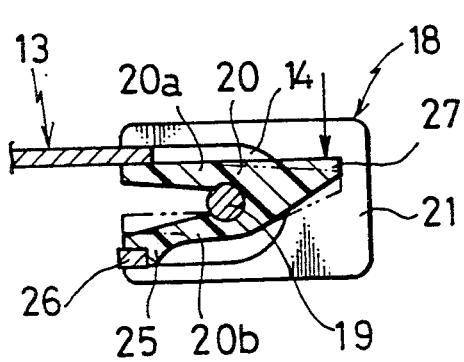
FIG. 10 is a section taken on the line 10—10 in FIG. 9.

The lower wall 20b has a click 25 which is formed on the underside of the lower wall 20b as shown in FIGS. 8 and 10 so as to engage a tip portion 26 of the wiper arm 13. The clip body 20 has a lever portion 27 which is forced into the slot 15 of the wiper arm 13 and forces the side edges of the curved portion 14 against the inner sides of the respective wall portions 21, 21. The lever portion 27 is formed to extend from the upper wall 20a to the lower wall 20b as shown in FIGS. 9 and 10 so that the clip body 20 is deformed by a force from the direction indicated by the arrow and the lower wall 20b approaches the upper wall 20a as indicated by the dash and dotted line to disengage the click 25 from the tip portion 26 of the wiper arm 13.

In the above mounting structure, when the wiper blade 16 is mounted on the wiper arm 13, the curved portion 14 of the wiper arm engages the clip body 20 of the clip 18 mounted on the wiper blade 16, while the lever portion 27 of the clip 18 is forced into the slot 15 of the curved portion 14. As a result, the click 25 engages the tip portion 26 of the wiper arm 13 so that the wiper blade 16 is securely connected to the wiper arm 13.

In that case, the lever portion 27 is forced into the slot 15 to increase the width of the curved portion 14 and cause the side edges of the curved portion 14 to closely contact the inner sides of the wall portions 21, 21. Consequently, the wiper arm 13 and the wiper blade 16 are prevented from wobbling and producing noise.

In addition, when the wiper blade 16 is disengaged from the wiper arm 13, the lever portion 27 is pressed from the direction indicated by the arrow as shown in FIGS. 9 and 10, so that when the click 25 of the clip 18 is disengaged from the slot 15 of the wiper arm 13, the wiper blade 16 can be dismounted from the wiper arm 13. In this case, the operation is simple because the lever portion 27 is easily identified from the upper side.

What is claimed is:

1. A mounting structure for a vehicle wiper comprising:

a wiper arm having a curved portion formed by curving an end portion of the wiper arm, and an open slot at a tip of the curved portion, said curved portion provided with a pair of side faces, said slot formed to divide said curved portion into two sections;

a wiper blade provided with a pair of side frames;

a clip member made of resinous material positioned between the side frames of said wiper blade to connect the arm to the blade, the clip member having a body portion engaged by said curved portion, a pair of side wall portions, one formed at each side of said body portion, and a lever portion inserted into said slot to project outward from said curved portion, said body portion being provided with an upper wall and a lower wall, a click portion formed on said lower wall and engaging said slot to lock the arm to the clip member, each side wall portion having an inner side; said lever portion formed so as to be forced into said slot to force the side faces of said curved portion against the inner sides of said wall portions, and said lever portion being formed on said body portion and extending from the upper wall to the lower wall of said body portion, said lever serving to disengage said click portion from said slot through deformation of said body portion, by pressing said lever portion; and a rivet member through which said clip member is mounted on said wiper blade.

* * * * *